United States Patent
Morton et al.

(10) Patent No.: US 6,438,564 B1
(45) Date of Patent: Aug. 20, 2002

(54) METHOD FOR ASSOCIATING A DISCUSSION WITH A DOCUMENT

(75) Inventors: Michael Joseph Morton, Seattle; David Serge Ebbo; Samudra Sengupta, both of Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/098,978

(22) Filed: Jun. 17, 1998

(51) Int. Cl.[7] .................. G06F 17/21; G06F 17/24; G06F 15/16
(52) U.S. Cl. ................ 707/500; 707/512; 709/206; 709/217
(58) Field of Search ............... 707/6, 526, 500, 707/4, 512; 709/204, 218, 228, 206, 217; 713/200

(56) References Cited

U.S. PATENT DOCUMENTS

| | | | | |
|---|---|---|---|---|
| 5,537,526 A | | 7/1996 | Anderson et al. ........... 395/148 |
| 5,806,079 A | * | 9/1998 | Rivette et al. .............. 707/512 |
| 5,826,025 A | * | 10/1998 | Gramlich .................... 709/217 |
| 5,860,074 A | * | 1/1999 | Rowe et al. ................. 707/526 |
| 5,898,836 A | * | 4/1999 | Freivald et al. ............. 709/218 |
| 5,905,863 A | * | 5/1999 | Knowles et al. ............. 709/206 |
| 5,907,681 A | * | 5/1999 | Bates et al. ................. 709/228 |
| 5,913,212 A | * | 6/1999 | Sutcliffe et al. ............... 707/6 |
| 5,930,471 A | * | 7/1999 | Milewski et al. ........... 709/204 |
| 6,012,087 A | * | 1/2000 | Freivald et al. ............. 709/218 |
| 6,026,396 A | * | 2/2000 | Hall ............................. 707/4 |
| 6,041,335 A | * | 3/2000 | Merritt et al. .............. 707/512 |
| 6,209,100 B1 | * | 3/2001 | Robertson et al. .......... 713/200 |

OTHER PUBLICATIONS

Roseman, Mark et al., TeamRooms: network places for collaboration, Proceedings of the ACM 1996 conference on Computer supported cooperative, pp. 325–333, Nov. 1996.*

Ernst, Warren, Using Netscape, Que Corporation, pp. 151–167, 1995.*

* cited by examiner

*Primary Examiner*—Stephen S. Hong
*Assistant Examiner*—William L. Bashore
(74) *Attorney, Agent, or Firm*—Merchant & Gould (57) ABSTRACT

Associating a discussion with a document by associating the discussion with an identifier for the document, such as the document address. A discussion is associated with the document without modifying the document. A reply can be associated with a general discussion, an in-line discussion or another reply. General and/or in-line discussions can be associated with the document. An in-line discussion is associated with a particular portion of the document through a signature. The signature is determined by analyzing the contents of the document near the in-line discussion location.

28 Claims, 8 Drawing Sheets

METHOD FOR ASSOCIATING A DISCUSSION WITH A DOCUMENT

FIELD OF THE INVENTION

This invention relates in general to the association of a discussion with a document, and more particularly to inserting a discussion into a document by associating the discussion with an identifier for the document.

BACKGROUND OF THE INVENTION

A document is often the result of the efforts of many people. For example, in addition to the author, multiple reviewers may provide comments and suggestions. Some comments may be directed to the document as a whole, whereas other comments may be directed to particular portions of the document. Ultimately, the comments must be compiled, reviewed and incorporated into the document.

Consider the situation where an author sends a draft of a document to five people to review. The draft may be distributed by sending each reviewer a paper copy of the document or an electronic copy of the document. Generally, each reviewer provides comments by editing the document or by adding comments to the document. The reviewers may comment upon the document by adding handwritten comments to a paper copy of the document or by annotating an electronic copy of the document using an annotation feature of a word processing program. Once the document is reviewed, each reviewer generally returns his or her copy of the document to the author. The author could receive a different set of comments from each reviewer. Typically, the comments made by each reviewer are made without the benefit of the other reviewers comments. The author is then left to sort through the comments to determine which comments are duplicative and to resolve any conflicting comments.

To try to limit duplicate and conflicting comments, the author may decide to route only a single copy of the document. The document may be sent sequentially to each reviewer. Although this solution allows the last reviewer to see the comments of the other reviewers, the other reviewers do not receive the same benefit. Furthermore, only one of the reviewers can review the document at a time. If the document is routed to a reviewer who is unavailable for a week, then no one may review the document for at least a week, even if another reviewer is available to review the document. Therefore, there is a need for a method to comment upon a document that accommodates multiple reviewers. Preferably, the method should allow multiple reviewers to review the document simultaneously and to see the comments of the other reviewers.

In addition to commenting upon a draft of a document, a reviewer may want to attach another document that is relevant to the document. If the other document is a paper document, then the reviewer can send the paper document to the author. The paper document may include the reviewer's handwritten notes. Alternatively, the other document may be an electronic document accessible via a web, such as an HTML (HyperText Markup Language) document accessible via an intranet. The reviewer could print the electronic document, add the reviewer's comments to the printed copy, and then route the printed copy to the author. However, it would be easier if the reviewer could insert comments into the other document while viewing the document.

It would be particularly useful if comments could be inserted into an HTML document because HTML is commonly used to create documents distributed over a network, such as the Internet. An advantage of HTML is that it is platform independent, so an HTML document may be displayed on a number of different display devices using a number of different browsers. Documents accessible via the Internet are typically read-only. Therefore, a reader cannot edit an Internet document, such as an HTML document, to insert comments into the document. Thus, there is also a need in the art for a method for inserting comments into a read-only document.

SUMMARY OF THE INVENTION

The present invention meets the needs described above by providing a method for associating a discussion with a document by associating the discussion with a document identifier, such as the address for the document. A discussion includes comments, annotations, and notes and is typically used to provide commentary on the document. Advantageously, a discussion may be associated with any document that the user can access, regardless of whether the user created the document or can modify the document.

General discussions, in-line discussions, and replies may be associated with a document. A general discussion is a discussion that is directed to the document as a whole. An in-line discussion is a discussion that is directed to a particular portion of the document, such as a particular paragraph. A reply responds to a general discussion, an in-line discussion, or another reply. A general discussion includes general discussion text, an in-line discussion includes in-line discussion text, and a reply includes reply text. As used herein, the terms "discussion text" and "reply text" include text, as well as graphics, data, hypertext links, and other types of information.

In one aspect of the invention, a discussion is associated with a document through a document identifier for the document such as the document address. The discussion is received from the user while the user is viewing the document. Once the discussion is received, the discussion is associated with the document through the document identifier. The discussion is associated with the document through the document identifier by creating a database entry for the discussion that includes the document identifier. The discussion is stored independently of the document. In this manner, the discussion can be retrieved whenever the document is accessed. When a request to access the document is detected, the document is displayed, the discussion is obtained, and the discussion is displayed along with the document. The discussion may be either a general discussion or an in-line discussion. An in-line discussion typically includes in-line discussion text and an in-line signature. If the discussion is an in-line discussion, then the in-line discussion is displayed at a location in the document that corresponds to the in-line signature. To determine the location in the document that corresponds to the in-line signature, a possible discussion location is heuristically determined and a signature is calculated for the possible discussion location. A determination is made as to whether the signature matches the in-line signature. If the signature matches the in-line signature, then the in-line discussion text is displayed at the possible discussion location.

In another aspect of the invention an in-line discussion can be inserted at a possible discussion location for an in-line discussion. The possible discussion location is identified by displaying a discussion icon at the possible discussion location. Typically, a location for the in-line discussion is determined by detecting a tag that defines the end of a paragraph. A signature is calculated for the location and a discussion icon is displayed at the location. The signature is generally calculated by calculating the Cyclic Redundancy Check of a predetermined number of characters that precede the tag defining the. end of the paragraph.

If the discussion icon is selected by the user, then in-line discussion text for the in-line discussion is received from the user and the in-line discussion is created at the location corresponding to the discussion icon. Creating the in-line discussion typically includes displaying the in-line discussion text and an action icon. The in-line discussion is associated with the document through the document address. Generally, the in-line discussion is associated with the document by creating a database entry based upon the in-line discussion text, the signature, and the document address.

A reply can be inserted in the document to respond to a general discussion, an in-line discussion or an existing reply. To reply, the user selects a parent discussion by selecting the action icon associated with a general discussion, an in-line discussion or a reply and enters reply text. The reply is created following the parent discussion. The reply is associated with the parent discussion through an identifier for the parent discussion. Generally, the reply is associated with the parent discussion by creating a database entry based upon the reply text and the parent discussion identifier.

These and other aspects, features and advantages of the present invention may be more clearly understood and appreciated from a review of the following detailed description of the disclosed embodiments and by reference to the appended drawings and claims.

DETAILED DESCRIPTION

The present invention is directed to a method for associating a discussion with a document. In one embodiment, the invention is incorporated into the "Office" application suite marketed by Microsoft Corporation of Redmond, Washington. Briefly described, the present invention is directed towards a method for associating a discussion with a document by associating the discussion with a document identifier. As used herein, the term "discussion" includes comments, annotations, and notes. The term "discussion" also includes a discussion between or among different users so that one user can reply or comment upon a discussion inserted by another user.

A discussion may be inserted into any document that the user can access, regardless of whether the user created the document or can modify the document. For example, the present invention allows the user to insert a discussion into an HTML (HyperText Markup Language) document that is accessible via the Internet or an intranet. General discussions, in-line discussions, or replies may be inserted into a document. A general discussion is a discussion that is directed to the document as a whole. An in-line discussion is a discussion that is directed to a particular portion of the document, such as a particular paragraph. A reply responds to a general discussion, an in-line discussion, or another reply.

Exemplary Operating Environment

Figure 1:
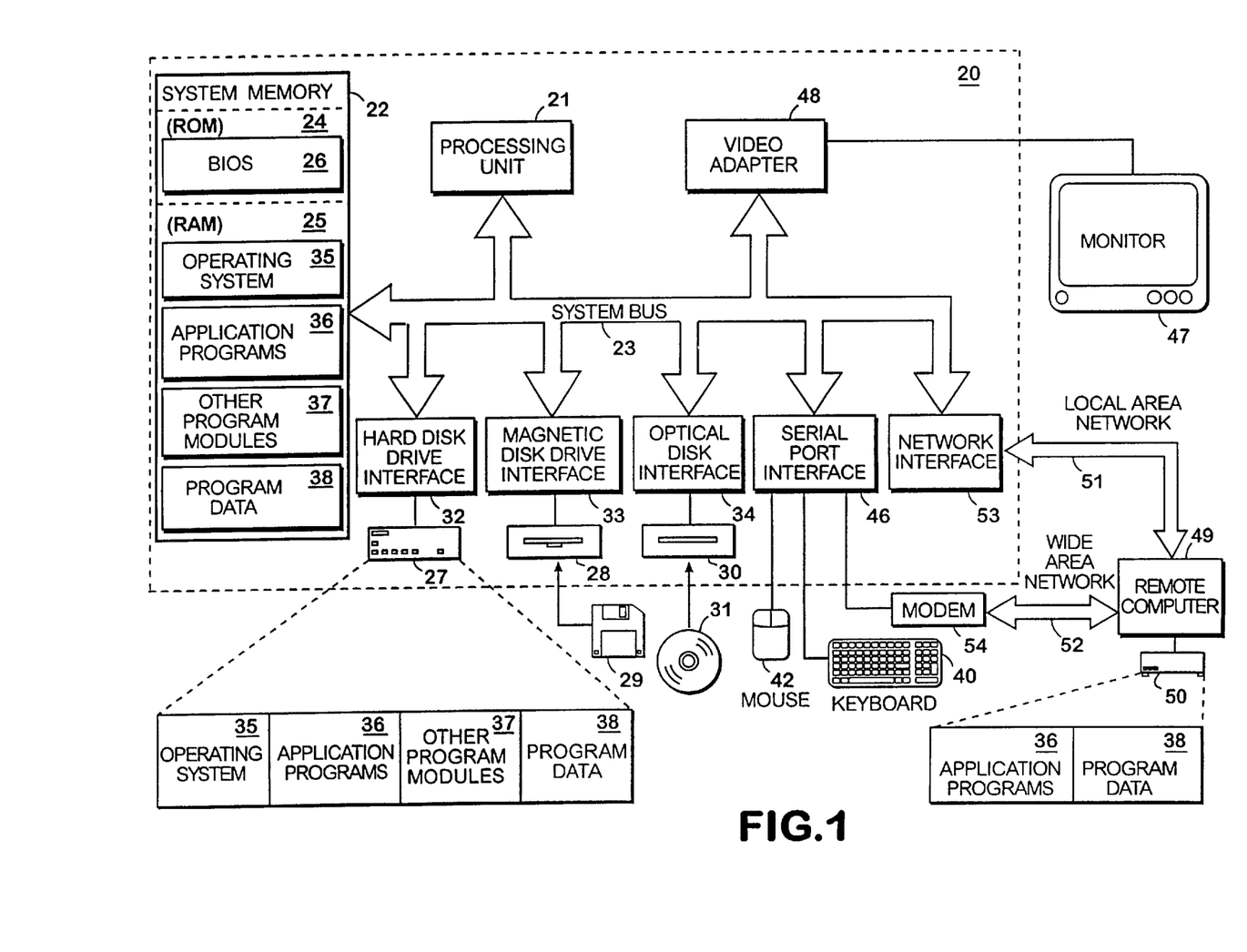
FIG. 1 is a block diagram of a personal computer illustrating the operating environment for an embodiment of the present invention.

FIG. 1 and the following discussion are intended to provide a brief, general description of a suitable computing environment in which the present invention may be implemented. While the present invention will be described in the general context of a networking environment, those skilled in the art will recognize that the invention also may be implemented in other environments. In a networking environment, tasks are performed by remote processing devices that are linked through a communications network. Program modules may be located in both local and remote memory storage devices. Generally, program modules include routines, programs, components, data structures, etc. that perform particular tasks or implement particular abstract data types. The invention may also be practiced in the context of an application program that runs on an operating system in conjunction with a personal computer or in combination with other program modules. Moreover, those skilled in the art will appreciate that the invention may be practiced with other computer system configurations, including hand-held devices, multiprocessor systems, microprocessor-based or programmable consumer electronics, minicomputers, mainframe computers, and the like.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory ("ROM") 24 and random access memory ("RAM") 25. A basic input/output system 26 ("BIOS"), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus ("USB"). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network ("LAN") 51 and a wide area network ("WAN") 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary Networked Environment

In a networked environment, the personal computer 20 may access a document stored on a memory storage device 50 of a remote computer 49. Typically, the document is identified by a unique network address, commonly referred to as a universal resource locator ("URL"). The document may be presented to the user by displaying the document on a display device 47 coupled to a personal computer 20 using a program module commonly referred to as a browser. A number of different browsers are available, such as the "Internet Explorer" browser distributed by Microsoft Corporation of Redmond, Wash.

HTML

Many network documents are created using a generalized markup language, such as HTML. HTML allows an author to specify the content of a document independent of the browser or computer system used by the user. In addition to text, HTML documents may contain links to images or other documents. A hypertext link ("hyperlink") is used to link the HTML document to an image or to another document.

HTML defines the syntax and placement of special embedded tags that are not displayed by the browser. These HTML tags advise the browser as to how to display the contents of the document by defining the elements of the document. An HTML tag includes a tag name followed by an optional list of tag attributes. The tag name and any attributes are enclosed within brackets (< >). For example, the head of a document is defined by the head tag (<HEAD> . . . </HEAD>) and the body of the document is defined by the body tag (<BODY> . . . </BODY>). The elements of the body of the document are defined using additional tags such as the paragraph tag (<P> . . . </P>) and the level n header tag (<Hn> . . . </Hn>). To display an HTML document on a display device, a browser recognizes the HTML tags and formats the document using the HTML tags and any user-defined browser parameters.

Discussions

In one embodiment, a discussion can be inserted into a document while the user is viewing the document using a browser. Typically, a discussion includes several discussion fields, such as a text field. The text field includes discussion text, such as HTML text. As used herein, the term "discussion text" includes text, graphics, data, hyperlinks, and other types of information. In addition to the text field, the discussion may include a subject field, an author field, and a time and date field.

The user can insert a general discussion and/or an in-line discussion. A general discussion is typically directed to the document as a whole and is displayed with the document. For example, if the document is displayed within a display window, then the general discussion is displayed at the bottom of the display window. An in-line discussion is typically directed to a portion of the document and is displayed near that portion of the document. For example, if an in-line discussion is directed to a particular paragraph, then the in-line discussion is displayed after that paragraph.

Discussion Toolbar

Figure 2:
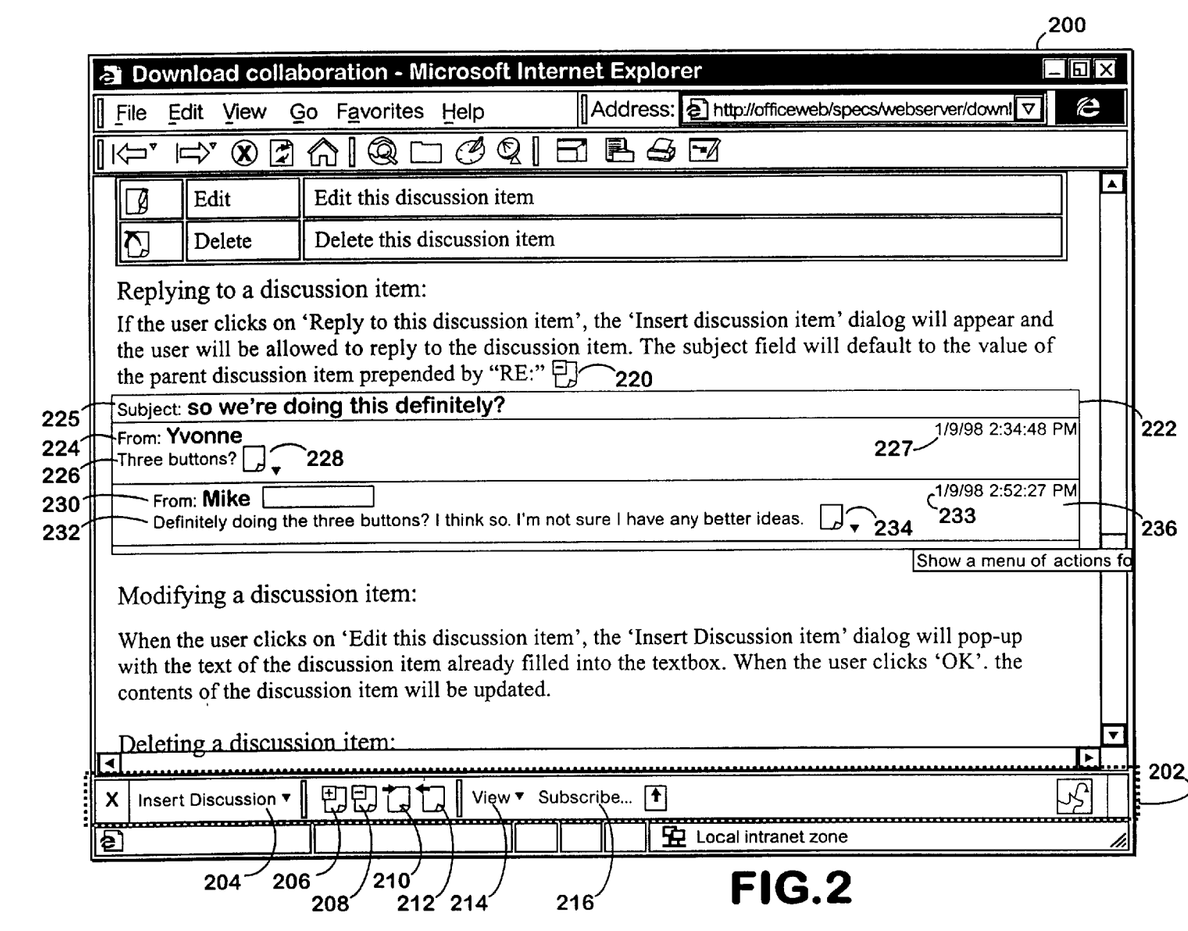
FIG. 2 is an illustration of a display window, including a discussion toolbar, in accordance with an embodiment of the present invention.

As illustrated by FIG. 2, a discussion toolbar 202 can be presented to the user within the display window 200. The discussion toolbar 202 presents the user with options for inserting and/or viewing discussions associated with the displayed document. The exemplary discussion toolbar shown in FIG. 2 includes an Insert Discussion option 204, an Expand All option 206, a Collapse All option 208, a Previous Discussion option 210, a Next Discussion option 212, a View option 214, and a Subscribe option 216.

The Insert Discussion option 204 allows the user to insert a general or an in-line discussion into the displayed document. If the user selects the Insert Discussion option 204, then generally a pop-up menu presents the user with the option of inserting a general discussion or inserting an in-line discussion. Once the user elects to insert either a general discussion or an in-line discussion, the user enters the discussion text via an insert discussion dialog box. Typically, the insert discussion dialog box allows a user to enter the subject of the discussion, as well as the discussion text.

The user can toggle the display format of the in-line discussions using the Expand All option 206 and the Collapse All option 208. If the user selects the Expand All option 206, then the entire in-line discussion text is displayed for each of the in-line discussions. If the user selects the Collapse All option 208, then the in-line discussion text is not displayed for any of the in-line discussions. A discussion expand/collapse icon 220 is displayed for each of the in-line discussions. If the in-line discussion text is not displayed, then the expand/collapse icon includes a plus sign ("+"). If the in-line discussion text is displayed, then the expand/collapse icon includes a minus sign ("−"). The user can display the entire in-line discussion text for an in-line discussion by clicking on the discussion expand/collapse icon for the in-line discussion when the icon includes a plus sign. Alternatively, the user can display the entire in-line discussion text for all the in-line discussions by selecting the Expand All option 206.

If there are multiple in-line discussions inserted in the document, then it may not be possible to simultaneously display all of the in-line discussions in the display window. To view the in-line discussions in the document, the user can use the Previous Discussion option 210 and the Next Discussion option 212 to scroll between the in-line discussions. The Previous Discussion option 210 scrolls the document so that the previous in-line discussion is visible in the display window. The Next Discussion option 212 scrolls the document so that the next in-line discussion is visible in the display window. For example, a document may have an in-line discussion after the second paragraph and another in-line discussion after the fifth paragraph. If the fourth and fifth paragraphs of the document are displayed in the display window, then selecting the Previous Discussion option 210 scrolls the document so that the in-line discussion after the second paragraph is displayed in the display window. If the third and fourth paragraphs of the document are displayed in the display window, then selecting the Next Discussion option 212 scrolls the document so that the in-line discussion after the fifth paragraph is displayed in the display window.

The View option 214 allows the user to select which discussions are displayed and which discussion fields are displayed. The user can select all discussions, discussions created by certain authors, or discussions created after a certain date. The user also can elect to display some or all of the fields of the discussion. These fields typically include an author field, a subject field, a time and date field, and a text field. If the text field is selected, then the entire discussion text is displayed. If the text field is not selected, then only the subject of the discussion text is displayed. The view option also allows the user to specify a server for obtaining or storing discussions.

General Discussions

Figure 3:
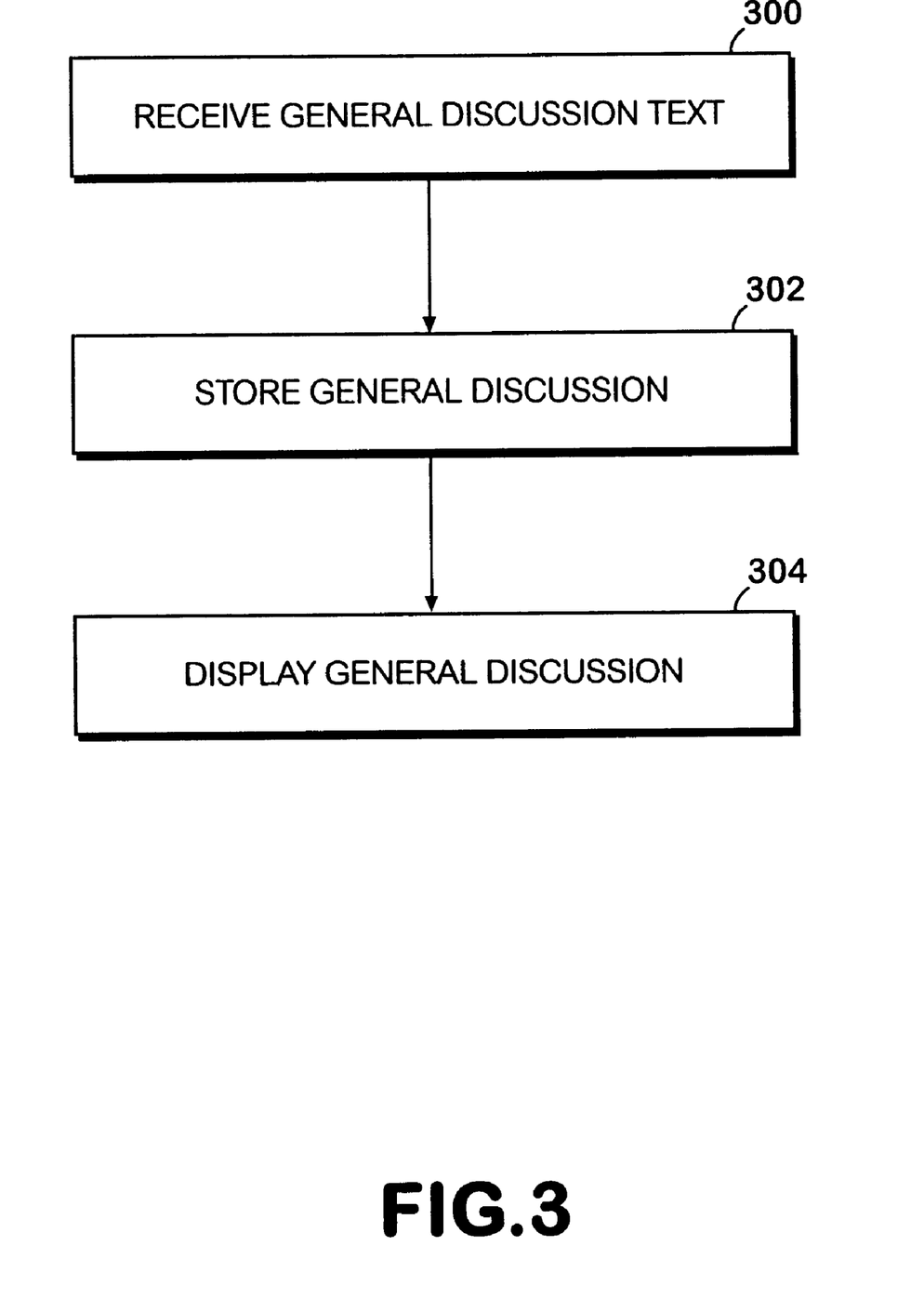
FIG. 3 is a flow diagram illustrating the steps for inserting a general discussion in accordance with an embodiment of the present invention.

An exemplary method for creating a general discussion is shown in FIG. 3. Once the user has elected to insert a general discussion, the user enters discussion text for the general discussion via the insert discussion dialog box. In step 300, the general discussion text is received from the user. In step 302, the general discussion is stored. The general discussion is stored separately from the document. The general discussion preferably is stored in a discussion database on a discussion server as soon as the discussion is created. To store the discussion, a database entry is created. that includes a document identifier, typically the document URL, the general discussion text, and other information, such as the author's name and the date and time the discussion was created. The document URL uniquely identifies the document and is preferably used as the document identifier. The general discussion is displayed in step 304. Although, FIG. 3 shows that the display of the general discussion follows the storage of the general discussion, the display and the storage are performed independently and could be reversed.

As shown in step 302 of FIG. 3, the general discussion is stored in a discussion database. Preferably, the database entry is created using standard HTTP (hypertext transfer protocol). For example, a discussion may be added to the document entitled "security.html" by posting the following exemplary message:

http://script/owspost.asp?DOCUMENT=
http://officeweb/specs/webserver/security.html&
SUBJECT=pivot%20tables&SENDER=mike&
TEXT=This is the text of the message The message includes the document identifier, the general discussion text, and the author of the discussion, as well as other information about the discussion. In the message shown above, the document identifier is http:H//officeweb/specs/webserver/security.html, the discussion text is "This is the text of the message," the subject of the discussion is pivot tables, and the author of the discussion is "Mike."

Figure 4:
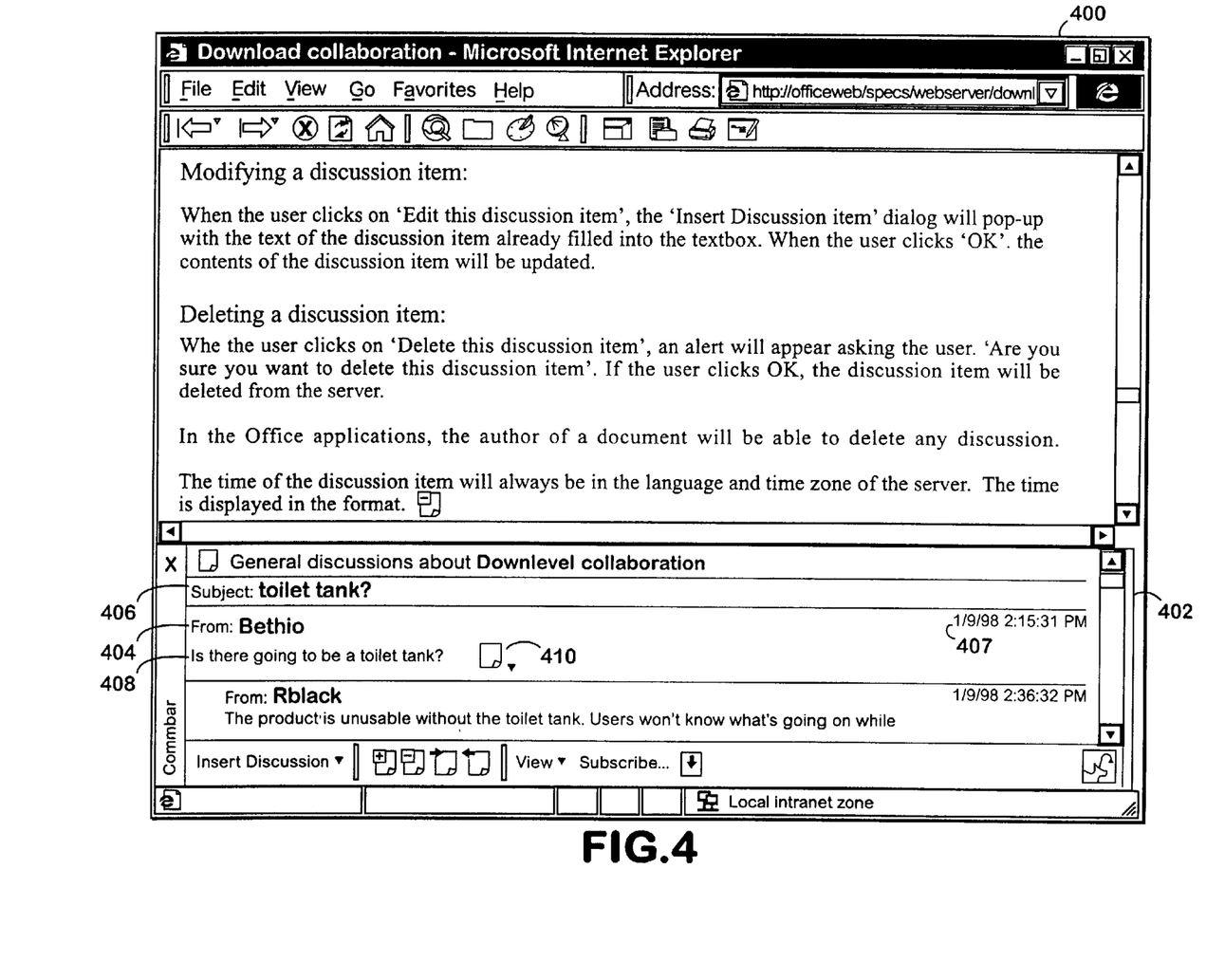
FIG. 4 is an illustration of a display window displaying a general discussion in accordance with an embodiment of the present invention.

The display of a general discussion in step 304 is illustrated by FIG. 4. Preferably, the general discussion is displayed with the document by displaying the general discussion at the bottom of the display window 400. The general discussion 402 shown in FIG. 4 includes an author field 404, a subject field 406, a time and date field 407, and the general discussion text 408. In addition, the general discussion includes a discussion action icon 410 at the end of the general discussion text 408. If the user selects the discussion action icon 410, then the user is presented with a menu of action items. The action items typically include replying to the general discussion, modifying the general discussion, and deleting the general discussion. Preferably, the modify action item and the delete action item are only available for the author of the discussion.

In-line Discussions

If the user elects to insert an in-line discussion, then a discussion icon appears at each of the possible discussion locations within the document. Preferably, the discussion locations are selected so that discussions can be inserted throughout the document. For example, a discussion location can be defined at the end of each paragraph. Once the user selects a discussion location by clicking on a discussion icon, then an insert discussion dialog box appears. The user enters the in-line discussion text using the insert discussion dialog box.

Figure 5:
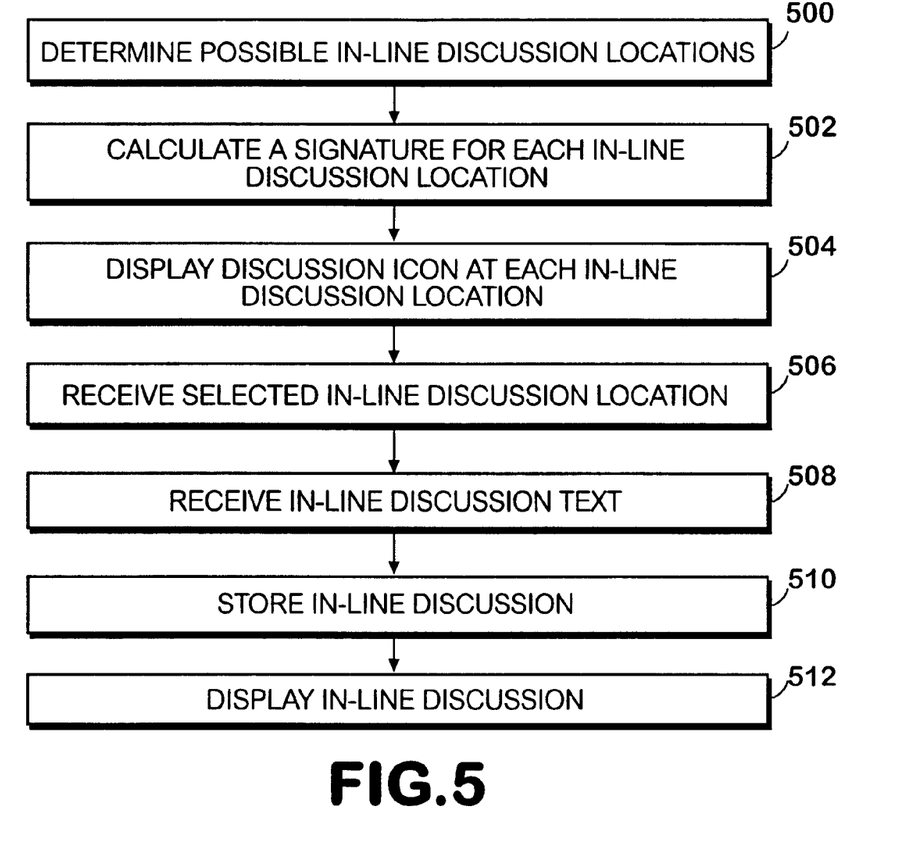
FIG. 5 is a flow diagram illustrating the steps for inserting an in-line discussion in accordance with an embodiment of the present invention.

An exemplary method for inserting an in-line discussion is shown in FIG. 5. Once the user has indicated that the user wishes to insert an in-line discussion, the possible in-line discussion locations are heuristically determined in step 500. In one embodiment, the in-line discussion locations are determined by HTML tags, such as paragraph tags (<P> . . . </P>). Other HTML tags, such as list tags (<LI> . . . </LI>), image tags (<IMG>), and table tags (<TABLE> . . . </TABLE>) can also be used to define in-line discussion locations. If table tags are used to determine in-line discussion locations, then a distinction is made between tables with borders and tables without borders. Preferably an in-line discussion is located after a table with borders, but not after a table without borders. An in-line discussion is not located after a table without borders because a table without borders is frequently used for document layout. The size of the elements of the document can also influence the possible in-line discussion locations. For example, if an element, such as a paragraph or an image, is smaller than a predetermined size, then an in-line discussion is not located after that element.

Once the in-line discussion locations are determined, a signature for each in-line discussion location is calculated as shown in step 502. A signature is an identifier for an in-line discussion location and is calculated based upon the contents of the document near the discussion location. In one embodiment, the in-line discussion location is at the end of a paragraph, and the signature is determined by calculating the CRC (Cyclic Redundancy Check) of the last sixty (60) characters of the paragraph. Preferably, a particular discussion location can be identified without modifying the document. Using a signature based on the CRC of the last sixty (60) characters of the paragraph identifies the in-line discussion location without modifying the document. In addition, using a signature based on the CRC of the characters of the paragraph identifiers the discussion location even if the paragraph is moved. As will be apparent to those skilled in the art, other methods of identifying a location that do not require modifying the document are possible.

In step 504, a discussion icon is displayed at each in-line discussion location. The user may select an in-line discussion location by clicking on the corresponding discussion icon. A selected in-line discussion location is received from the user in step 506. Once the selection of an in-line discussion location is received, an insert discussion dialog box is presented to the user. The user enters the in-line discussion text using the insert discussion dialog box in step 508.

In step 510, the in-line discussion is stored. The in-line discussion is stored in a discussion database on a discussion server. The in-line discussion is stored in a manner similar to that described above in connection with a general discussion. An entry in the database is created for each in-line discussion that includes the document address, e.g. document URL, the signature of the discussion location, the discussion text, and other information, such as the author's name and the date and time the discussion was created.

The in-line discussion is displayed at the in-line discussion location in step 512. FIG. 2 illustrates the display of an in-line discussion 222 at the end of a paragraph. The in-line discussion 222 includes an author field 224, a subject field 225, a time and date field 227 and the in-line discussion text 226. In addition, the in-line discussion includes a discussion action icon 228 at the end of the in-line discussion text 226. Preferably, the discussion action icon 228 is visually distinct from the discussion icon. If the user selects the discussion action icon 228, then the user is presented with a menu of action items. The action items include replying to the in-line line discussion, modifying the in-line discussion, and deleting the in-line discussion. Preferably, the modify action item and the delete action item are only available for the author of the discussion.

Replies

Figure 6:
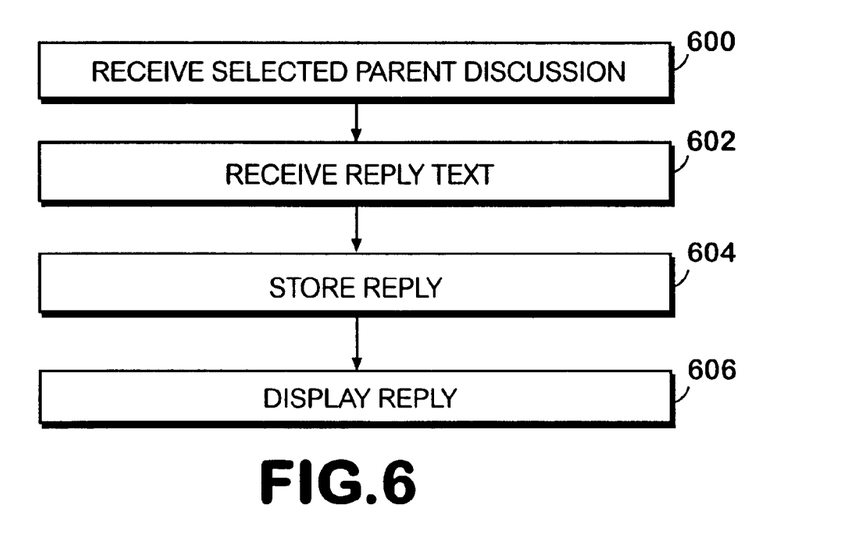
FIG. 6 is a flow diagram illustrating the steps for inserting a reply in accordance with an embodiment of the present invention.

A reply allows the user to respond to or comment upon a general discussion, an in-line discussion or an existing reply. An exemplary method for inserting a reply is illustrated by FIG. 6. In step 600, a parent discussion is selected by the user. The parent discussion can be a general discussion, an in-line discussion or a reply. The user selects the parent discussion by selecting the discussion action icon at the end of the discussion and then selecting the reply action item. In step 602, the user enters the reply text via an insert discussion dialog box. A user enters the reply text in a manner similar to that described above in connection with entering discussion text for a general discussion.

In step 604, the reply is stored. The reply is stored in the discussion database on the discussion server. An entry in the database is created for each reply that includes the document address, e.g. document URL, a parent discussion identifier, the reply text, and user information, e.g. user name, date, and time. The parent discussion identifier is typically assigned by the discussion database. For example, the entries in the database may be automatically numbered. The entry for the reply includes the parent discussion identifier so that the reply is associated with the correct general discussion, in-line discussion, or reply.

In step 606, the reply is displayed. FIG. 2 illustrates the display of a reply 236. The reply 236 replies to the in-line discussion 222. The reply 236 in FIG. 2 is indented to indicate that the reply is a response to the in-line discussion 222. The reply 236 includes an author field 230, the reply text 232, a time and date field 233, and a discussion action icon 234.

Displaying Discussions Associated with a Document

To collaborate on a document, it is helpful if a user can view the discussions inserted by the other users. Therefore, when the user accesses the document, all the discussions associated with the document, not just the discussions inserted by that user, are displayed. As discussed in more detail above in connection with general discussions, in-line discussions and replies, a discussion is associated with a document through a document identifier, such as a document address. The discussions are stored on a discussion server and the document is stored on a document server. Whenever the document is retrieved from the document server, the discussion server is checked to determine whether there are any discussions associated with the document. If there are discussions associated with the document, the discussions are displayed with the document so that the user can review and/or reply to the discussions.

Figure 7A:
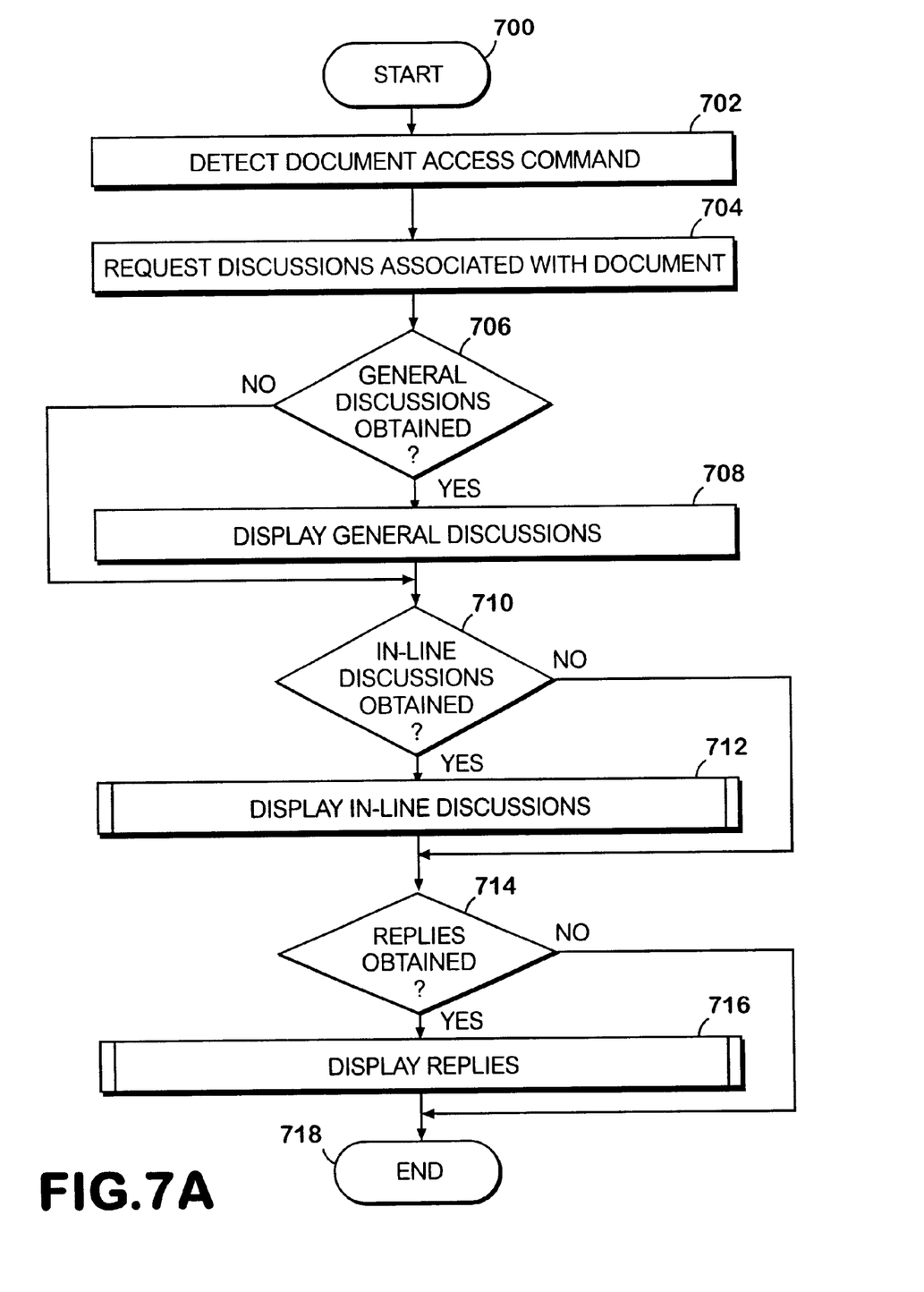
FIGS. 7A, 7B, and 7C are flow diagrams illustrating the steps for displaying discussions and replies associated with a document in accordance with an embodiment of the present invention.
Figure 7B:
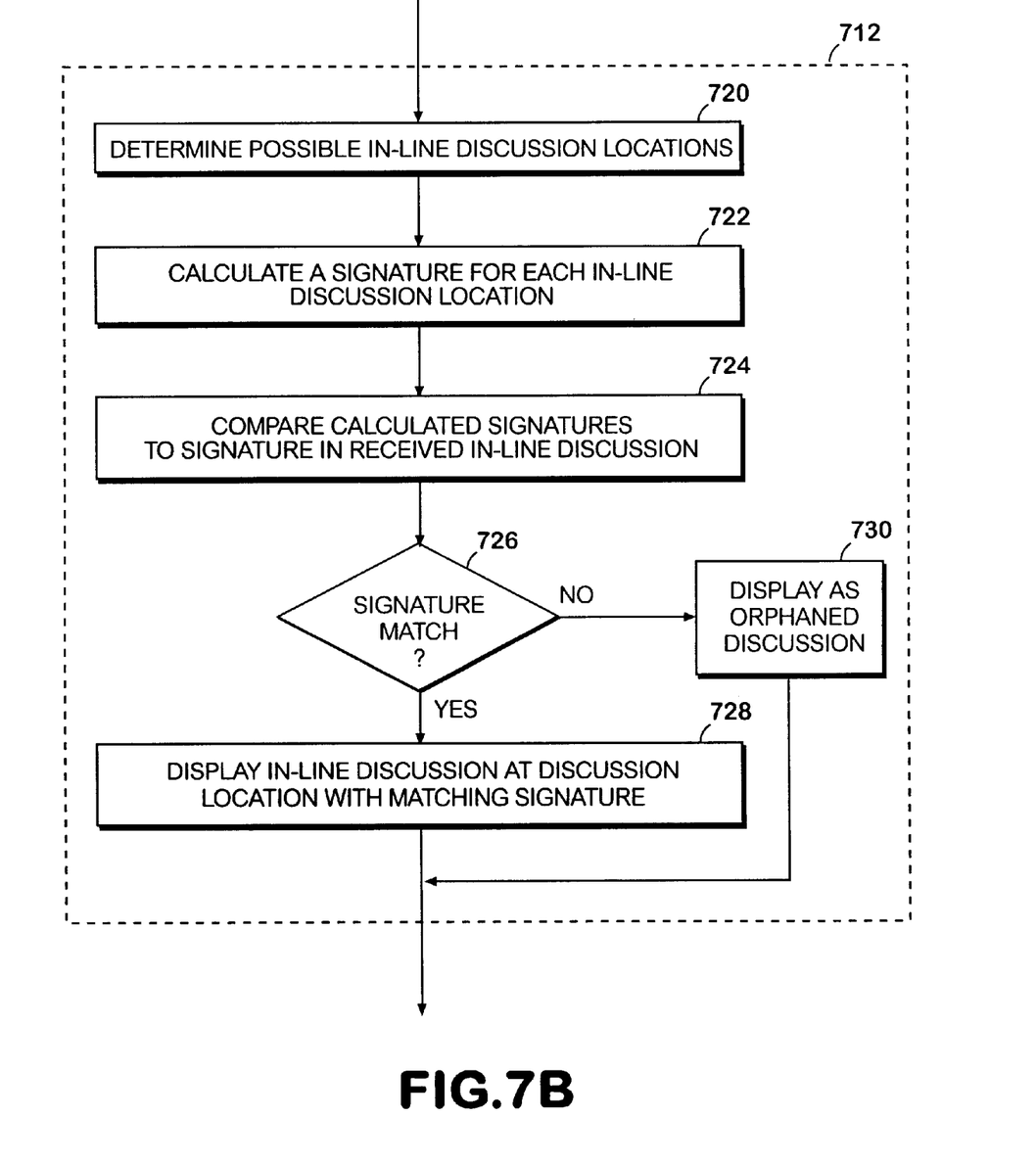

An exemplary method for displaying discussions associated with a document is illustrated by FIGS. 7A and 7B. The method begins at step 700 and proceeds to step 702. In step 702, a document access command is detected. To detect a document access command, the browser can be monitored to detect events that correspond to accessing a document, e.g. BeforeNavigate and NavigateComplete events. In an intranet environment, other events, such as a NewDocument or a DocumentOpen event, are detected. A BeforeNavigate event occurs before a document is accessed and includes the URL for the document. The NavigateComplete event occurs after the document is fully loaded in the browser. Once a BeforeNavigate event is detected in step 702, the method proceeds to step 704. In step 704, a request is sent to the discussion server to obtain discussions associated with the document.

Preferably, the request uses standard HTTP. For example, a discussion associated with a document entitled "security.html" may be requested using the following exemplary request:

http://scripts/owsget.asp?DOCUMENT=
http://officeweb/specs/webserver/security.html Typically, all of the discussions associated with a document are requested. If the user elects to view only discussions authored by a particular user, then only those discussions are displayed.

In response to the request of step 704, the discussion server queries the discussion database for entries that include a URL that matches the URL associated with the BeforeNavigate event. If any of the entries in the discussion database include a URL that matches the URL associated with the BeforeNavigate event, then the entries are retrieved.

In step 706, a determination is made as to whether general discussions associated with the document were obtained. If general discussions associated with the document were obtained, then once a NavigateComplete event is detected, the Yes branch is followed from step 706 and the general discussions are displayed in step 708. In an intranet environment, a DocumentOpen event is detected rather than a pair of BeforeNavigate and NavigateComplete events. In one embodiment, the general discussions are displayed before the in-line discussions because the display location of the general discussions is not based upon the contents of the document, whereas the display locations of the in-line discussions are based upon the contents of the document. However, the display of the general discussions is independent of the display of the in-line discussions so the display order could be reversed. If the display order is reversed, then the in-line discussions are not displayed until the Navigate-Complete is detected. Once the general discussions are displayed, the method proceeds to step 710. If the determination in step 706 is that no general discussions were obtained, then the No branch is followed from step 706 to step 710.

Figure 7C:
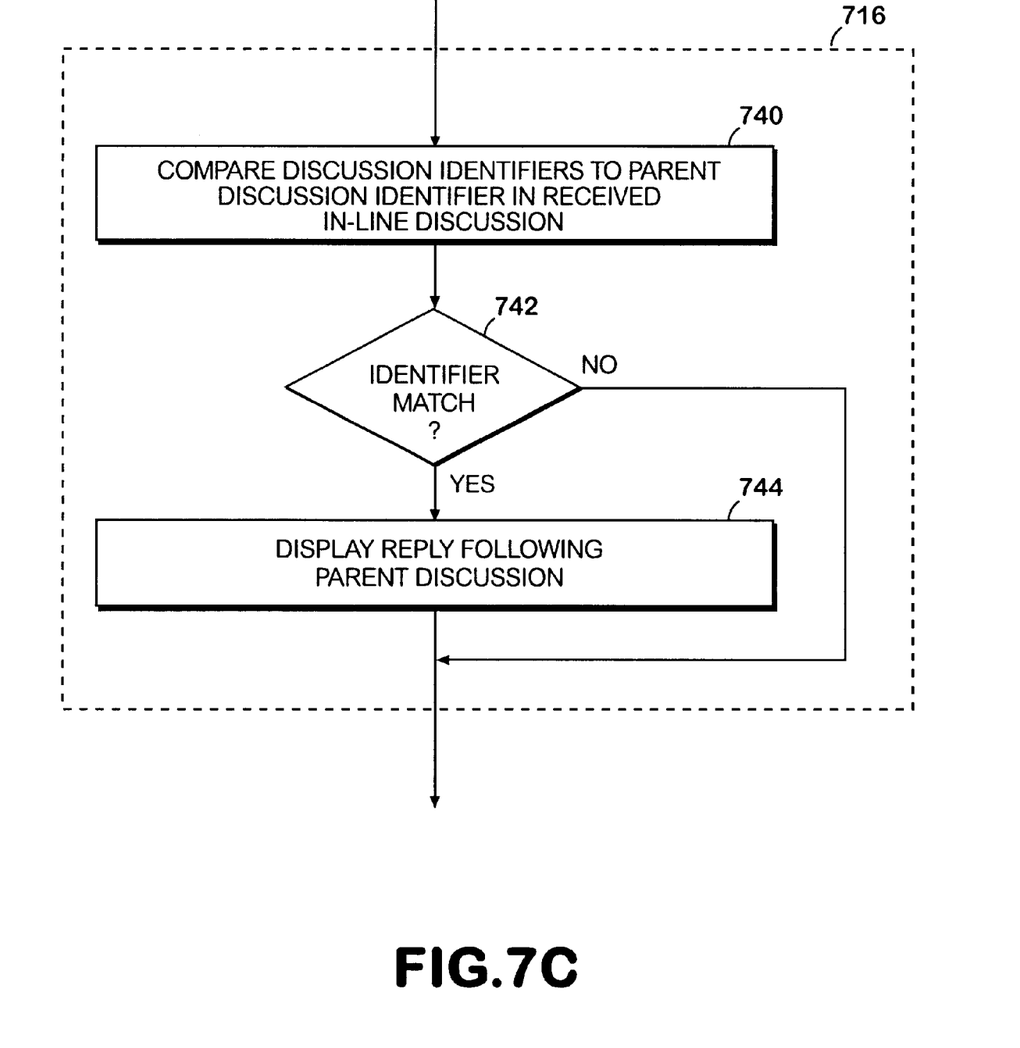

In step 710, a determination is made as to whether any in-line discussions were obtained. If in-line discussions were obtained, then the Yes branch is followed to step 712 and the in-line discussions are displayed. Further details of step 712 are shown in FIG. 7B. If the determination in step 710 is that no in-line discussions were received, then the No branch is followed to step 714 and the method ends. In step 714, a determination is made as to whether any replies were obtained. If replies were obtained, then the Yes branch is followed to step 716 and the replies are displayed. Further details of step 712 are shown in FIG. 7C. Once the replies are displayed, the method ends at step 718. If the determination in step 714 is that no replies were received, then the No branch is followed to step 718 and the method ends.

To display the in-line discussions in step 712, the possible in-line discussion locations in the document are determined in step 720 of FIG. 7B. In one embodiment, the document is an HTML document and the discussion locations are defined by HTML paragraph tags. In step 722, a signature is calculated for each discussion location. For example, the signature is calculated by calculating the CRC of the last sixty (60) characters of the paragraph. In step 724, the calculated signatures are compared to the signatures of the obtained in-line discussions. If there is a signature match, then the YES branch is followed from step 726 to step 728. In step 728, the in-line discussion is displayed at the in-line discussion location. If the signature of the received in-line discussion does not match any of the calculated signatures, then the received in-line discussion is an orphaned discussion and the NO branch is followed from step 726 to step 730. In step 730, the received in-line discussion is displayed as an orphaned discussion. Orphaned discussions may be displayed at the bottom of the display window along with any general discussions. Alternatively, the orphaned discussions may not be displayed unless specifically enabled by the user. Steps 724–730 are repeated for each in-line discussion obtained.

FIG. 7C illustrates the steps for displaying the replies. In step 740, the parent discussion identifier for a reply is compared to the discussion identifiers for the general discussions, the in-line discussions, and the replies. Typically, each general discussion, in-line discussion, and reply is associated with a discussion identifier. The assignment of a discussion identifier is a function of the discussion database. If the parent discussion identifier matches one of the discussion identifiers, then the Yes branch is followed from step 742 to step 744 and the reply is displayed. Steps 740–744 are repeated for each reply.

It is possible that multiple users may be viewing a document simultaneously. As each user inserts a discussion, an entry is created in the discussion database. To update the display of the document to include discussions added by other users, the user may select the Refresh button from the browser toolbar. Selecting the Refresh button refreshes the display by following the steps outlined above in connection with FIGS. 7A, 7B, and 7C so that any discussions that have been added since the document was last accessed or refreshed are displayed.

Alternatively, the user may elect to receive a notice whenever a discussion is added or updated by another user. The user can use the Subscribe option 216 of FIG. 2 to receive a notice. If the user selects the Subscribe option 216, then the user is presented with subscription options via a subscription dialog box. The subscription options include a document option, a notification event option, and a notification frequency option. The document option allows the user to specify a document. The document option defaults to the current document. If the user accepts the default option, then the user receives a notice whenever the selected notification event occurs in connection with the current document. The notification event options include a modification to the document or a modification to the discussions, including a new discussion. The notification frequency options include notify immediately, notify once a day, and notify once a week. The subscription dialog box also requests that the user enter a notification address. The notification is sent to the notification address which is typically the electronic mail address of the user.

Additional subscription options can also be included. For example, rather than specifying a single document, the user can specify any document in a folder that meets certain criteria. The criteria include the title and the author of the document. For example, the criteria could be that the document was created by a particular author or that the document contains a certain word in the title.

Although the present invention has been described in connection with an HTML document, those skilled in the art will realize that the present invention may also be used with other types of documents. If the document does not include tags, such as paragraph tags, then the discussion locations must be defined using some other type of document characteristic.

In summary, the present invention is directed toward a method for associating a discussion with a document by associating the discussion with a document identifier, such as the document address. A discussion can be associated with a document even though the user cannot modify the document. General and/or in-line discussions can be associated with a document. An in-line discussion is associated with a particular portion of the document through a signature. The signature is determined by analyzing the contents of the document near the in-line discussion location.

Alternative embodiments will become apparent to those skilled in the art to which the present invention pertains without departing from its spirit and scope. Accordingly, the scope of the present invention is described by the appended claims and is supported by the foregoing description.

What is claimed is:

1. A method for displaying a general discussion and an in-line discussion that have an association with a document, the in-line discussion including an identifier for an in-line discussion location in the document, comprising the steps of:

detecting a request to access the document, wherein the request to access the document operates as a request to obtain any discussions associated with the document;

in response to the request, obtaining the document, the general discussion and the in-line discussion;

displaying the document;

displaying the general discussion;

determining a possible location in the document for the in-line discussion;

calculating a signature for the possible location;

determining whether the signature matches the identifier; and if the signature matches the identifier, then displaying the in-line discussion at the possible location.

2. The method of claim 1, wherein the association is through a document address for the document, and wherein the step of obtaining the general discussion and the in-line discussion comprises requesting the general discussion and the in-line discussion associated with the document address.

3. The method of claim 1, wherein the document is stored on a document server, and wherein the step of obtaining the general discussion and the in-line discussion comprises receiving the general discussion and the in-line discussion from a discussion server that is distinct from the document server.

4. The method of claim 1, wherein the step of displaying the general discussion comprises displaying the general discussion with the document.

5. The method of claim 1, wherein the step of calculating a signature for the possible location comprises calculating a value based upon the documents content near the possible location.

6. The method of claim 1, wherein the step of displaying the in-line discussion comprises:
determining all possible locations in the document for the in-line discussion;
calculating a signature for each of the possible locations;
determining whether any of the signatures match the identifier; and
if none of the signatures match the identifier, then displaying the in-line discussion at a default location.

7. A method for identifying a plurality of locations in a document for an in-line discussion associated with the document, comprising the steps of:
identifying the locations based upon locations of elements in the document;
for each of the identified locations:
calculating a signature for the location based upon document contents proximate to the location, and
displaying a discussion icon at the location to indicate that an in-line discussion can be inserted at the location;
detecting a selection of the discussion icon;
receiving in-line discussion text for the in-line discussion;
displaying the in-line discussion at the location; and
associating the in-line discussion with the document through a document address.

8. The method of claim 7, wherein the step of associating the in-line discussion with the document comprises creating a database entry based upon the in-line discussion text, the signature, and the document address.

9. The method of claim 7, wherein the document comprises a paragraph, and wherein the step of determining the location comprises determining where the paragraph ends by detecting a tag that defines the end of the paragraph.

10. The method of claim 9, wherein the step of calculating the signature comprises calculating the Cyclic Redundancy Check of a predetermined number of characters that precede the tag.

11. The method of claim 7, wherein the document comprises a plurality of possible locations for the in-line discussion, and wherein the identifying, calculating, and displaying steps are repeated for each of the possible locations.

12. The method of claim 7, wherein the step of creating the in-line discussion comprises the steps of:
displaying the in-line discussion text; and
displaying an action icon following the in-line discussion text.

13. The method of claim 12, wherein the in-line discussion has an in-line discussion identifier, further comprising the steps of:
detecting a selection of the action icon;
receiving reply text;
creating a reply following the in-line discussion; and
associating the reply with the in-line discussion through the in-line discussion identifier.

14. The method of claim 13, wherein the step of associating the reply with the in-line discussion comprises creating a database entry based upon the reply text and the in-line discussion identifier.

15. A computer-readable medium having computer-executable instructions for displaying an in-line discussion associated with a document, the in-line discussion having an in-line discussion signature, comprising the steps of:
detecting a request to access the document, wherein the request to access the document operates as a request to obtain any discussions associated with the document;
in response to the request, obtaining the document and the in-line discussion;
determining possible in-line discussion locations in the document;
calculating a signature for each of the possible in-line discussion locations;
comparing the signatures to the in-line discussion signature for a match; and
if one of the signatures is the match to the in-line discussion identifier, then displaying the in-line discussion text at the possible in-line discussion location identified by the match.

16. The computer-readable medium of claim 15, wherein the document comprises tags, each tag defining a location of an element in the document, and wherein the step of determining the possible in-line discussion locations comprises determining the locations of the elements of the document by detecting the tags.

17. The computer-readable medium of claim 16, wherein the step of calculating a signature for each of the possible in-line discussion locations comprises:
for each of the tags, using a predetermined number of characters that precede the tag to calculate the signature.

18. A method for associating a document and an in-line discussion, comprising the steps of:
(a) displaying the document;
(b) receiving the discussion, the discussion including an in-line discussion and an in-line discussion signature identifying an in-line discussion location;
(c) associating the discussion with a document identifier for the document;
(d) detecting a request to access the document, wherein the request to access the document operates as a request to obtain any discussions associated with the document;
(e) in response to the request, obtaining the document and the discussion;
(f) displaying the document;
(g) determining a possible discussion location in the document;
(h) calculating a signature for the possible discussion location;
(i) determining whether the signature matches the in-line signature; and (j) if the signature matches the in-line signature, then displaying the in-line discussion text at the possible discussion location.

19. The method of claim 18, wherein the discussion is a general discussion, and wherein the step of receiving the discussion comprises receiving general discussion text from a user.

20. The method of claim 18, wherein the discussion is a general discussion, and wherein the step of displaying the discussion comprises displaying the general discussion text with the document.

21. The method of claim 18, comprising the step of repeating steps (g)–(j) for another possible discussion location.

22. The method of claim 18, wherein the document comprises a paragraph tag that defines a paragraph in the document, and wherein the step of determining the possible discussion location comprises determining the location of the paragraph in the document by detecting the paragraph tag.

23. The method of claim 18, wherein the step of associating the discussion with the document comprises creating a database entry based upon the discussion and the document identifier.

24. The method of claim 18, wherein the step of associating the discussion with the document comprises sending a notice to a notification address indicating that the discussion has been associated with the document.

25. A method for associating a reply with an in-line discussion that includes an identifier for an in-line discussion location, comprising the steps of:

(a) detecting a request to access a document;

(b) in response to the request, obtaining the in-line discussion;

(c) displaying the in-line discussion at the in-line discussion location by:
  determining a possible location in the document for the in-line discussion;
  calculating a signature for the possible location;
  determining whether the signature matches the identifier; and
  if the signature matches the identifier, then displaying the in-line discussion at the possible location;

(d) receiving reply text for the reply;

(e) displaying the reply following the in-line discussion; and (f) associating the reply with the parent discussion through an identifier for the parent discussion.

26. The method of claim 25, wherein the parent discussion is a first reply.

27. The method of claim 25, wherein step (f) comprises creating a database entry in a discussion database using the reply text and the identifier for the parent discussion.

28. The method of claim 25, wherein the parent discussion is stored in a discussion database and the identifier for the parent discussion is a function of the discussion database.

* * * * *